Dec. 26, 1939.  K. BEYERLE  2,184,576
SYSTEM FOR THE ELECTRICAL TRANSFER OF ROTARY MOTION
Filed Oct. 15, 1938
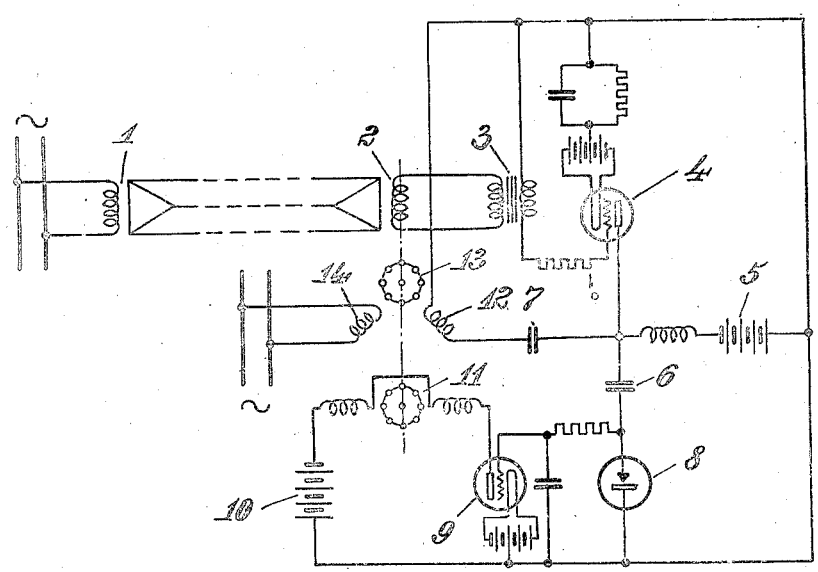
Inventor:
Konrad Beyerle,
Bailey Pearson
Attorneys Patented Dec. 26, 1939

2,184,576

UNITED STATES PATENT OFFICE 2,184,576

SYSTEM FOR THE ELECTRICAL TRANSFER OF ROTARY MOTION

Konrad Beyerle, Kiel-Neumuhlen, Germany, assignor to Anschütz & Co. G. m. b. H., Kiel-Neumuhlen, Germany Application October 15, 1938, Serial No. 235,263
In Germany October 21, 1937

3 Claims. (Cl. 172—239)

My invention relates to a system for the electrical transfer of rotary motion in which a sender is connected by electrical conductors with a receiver drivingly connected with and controlling a reversible electric motor which tends to reproduce any rotation of the sender.

If the sender performs rotations of a rapidly varying velocity, the electric motor controlled by the receiver is temporarily brought to its maximum speed so that, upon attaining the position prescribed by the sender, it may overshoot such position due to the inertia of its armature and of the objects geared thereto. In this event, it will perform gradually diminishing hunting movements about the prescribed position.

In order to counteract such hunting movements of the receiver it has been proposed prior to my invention to provide the reversible motor with an eddy current brake which is controlled in accordance with the energization of the reversible motor and renders the brake effective when the receiver arrives at the prescribed position. Thus, the brake tends to prevent the receiver from overshooting its mark. In this known arrangement, however, the eddy current brake is controlled by relay contacts. Such contacts are liable to produce radio interference and always a source of defects.

The object of my invention is to obviate this disadvantage and to provide an improved system for the electrical transfer of rotary motion which will not produce any radio interference and which is free from controlling contacts.

Another object of my invention is an improved system of the type referred to in which the eddy current brake is controlled without the use of any contacts by reliable means applying the braking action gradually and smoothly.

My invention will be described hereinafter by reference to a preferred embodiment thereof in which the reversible motor is a two-phase induction motor one phase of which is fed by a thermionic amplifying valve as described in the U. S. Patents No. 1,562,917 and 1,586,233 and the German Patent No. 467,134.

In the drawing, the circuit arrangement of my improved system is shown.

The sender 1 is constructed in the form of a rotary transformer, the primary side of which is excited by an alternating current and, according to its angular position, induces different alternating current voltages in three phase-windings of the secondary side. These phase-windings are connected by three long-distance lines, shown dotted, to corresponding phase-windings of the receiver 2 which is likewise constructed as a rotatable transformer. The three phase-windings of the input side of the receiver generate in the winding forming the output side a voltage the magnitude of which is determined by the relative angular position of the two rotors of the transmitter and receiver, and which will be equal to zero when the rotor of the receiver occupies the prescribed position in registry with the sender. This voltage through the medium of an amplifier controls a reversible motor 13 coupled or geared to the receiver rotor so that the motor tends to bring the rotor always to the prescribed position. For this purpose, the alternating current voltage induced in the receiver 2 passes through an input transformer 3 to the grid of an amplifier valve 4 possessing a direct current source 5 of anode current. The alternating current component of the output current is fed across a condenser 7 to the reversing phase 12 of the follow-up motor 13 constructed in the form of an induction motor. The other phase 14 of this motor is electrically at right-angles to the reversing phase 12. Furthermore, geared or clutched to the motor 13 is the object which is to be remote-controlled and which is to have its adjustment determined by the sender 1.

In the event of a sudden considerable movement of the sender 1, the alternating current voltage induced in the receiver 2 attains such a high value that the amplifier 4 is thereby fully controlled and the motor 13 is started at full speed. If now the motor 13 and the remote-controlled object coupled to it attains the prescribed position, it would overshoot this position in the absence of special precautions, and the result would then be to induce in the receiver a current of opposite phase which would then start the reversible motor in backward motion. In this case also, the motor could again overshoot the mark, so that it would reach the prescribed position with slowly diminishing hunting movements only.

In order to prevent this, the following arrangement is provided according to the invention. Mounted on the shaft of the follow-up motor 13 is the rotor of an eddy current brake 11, through the stationary winding of which passes the output current of a separate thermionic valve 9. The grid of this valve is fed through a condenser 6 with a partial voltage of the output alternating current of the amplifier valve 4, after said partial voltage has been converted into a negative grid-bias voltage by a rectifier 8.

When the follow-up motor 13 reaches the prescribed position, the alternating current voltage applied to the winding 12 disappears. The result is that the valve 9 does not receive any grid-bias voltage and consequently it feeds to the eddy current brake 11 an output current originating from the direct current source 10 of anode current. Therefore, the brake tends to arrest the receiver and the motor 13 in the prescribed position thus preventing them from overshooting such position. As soon, however, as the winding 12 is placed under voltage which is the case when the follow-up mechanism deviates from the prescribed position, the negative grid voltage produced by the condenser 6 and the rectifier 8 blocks the valve 9, so that the eddy current brake 11 becomes inoperative and releases the motor.

From the foregoing description it will appear that the brake winding 11 is fed fully with direct current when the receiver 2 has completed the movement prescribed by the sender 1 and has reached the prescribed position. The braking effect begins shortly before the receiver runs into the prescribed position. The effect of this gentle and somewhat advanced braking without any abrupt and sudden transitions is that no self-excited hunting occurs even in the case of a very steep control of the motor 13, and that controlling into the new position proceeds almost aperiodically, even in the case of rapid variations of the prescribed positions by considerable amounts.

While I have described my invention hereinabove with reference to a specific embodiment thereof, I wish it to be clearly understood that it is not limited to the details of this embodiment but is capable of numerous modifications which will readily occur to anyone skilled in the art. Thus, the thermionic valve controlling the brake may be itself controlled in numerous different ways and may act directly or indirectly on the brake.

What I claim is:

1. A system for the electrical transfer of rotary motion comprising a sender, a receiver connected thereto by electrical conductors, a reversible electric motor drivingly connected with and controlled by said receiver to reproduce any rotation of said sender, an eddy current brake connected with said electric motor and including a field winding, and means controlling said brake so as to counteract hunting of said motor, said controlling means comprising a thermionic valve controlling the energization of said field winding, and electrical connections extending between the terminals of said electric motor and said valve and causing the latter to energize said brake when the control voltage applied to said motor equals or approaches zero.

2. A system for the electrical transfer of rotary motion comprising a sender, a receiver connected thereto by electrical conductors, a reversible electric motor drivingly connected with and controlled by said receiver to reproduce any rotation of said sender, an eddy current brake connected with said electric motor and including a field winding, and means controlling said brake so as to counteract hunting of said motor, said controlling means comprising a thermionic valve supplying anode current to said winding and including a grid controlling said anode current, and means applying to said grid a voltage which depends upon the control voltage of said motor.

3. A system for the electrical transfer of rotary motion comprising a sender, a receiver connected thereto by electrical conductors, a reversible electric motor drivingly connected with and controlled by said receiver to reproduce any rotation of said sender, an eddy current brake connected with said electric motor and including a field winding, and means controlling said brake so as to counteract hunting of said motor, said controlling means comprising a thermionic valve supplying anode current to said winding and including a grid, a rectifier connected with said motor and adapted to rectify a fraction of the control voltage thereof and to supply said rectified voltage to said grid.

KONRAD BEYERLE.